US008762251B2

(12) United States Patent
Doherty et al.

(10) Patent No.: US 8,762,251 B2
(45) Date of Patent: Jun. 24, 2014

(54) ALTERNATIVE TRADING SCORECARD APPARATUSES, METHODS, AND SYSTEMS

(75) Inventors: James Doherty, New York, NY (US); Daniel Mathisson, New York, NY (US)

(73) Assignee: Credit Suisse Securities (USA) LLC, New York, NY (US)

(*) Notice: Subject to any disclaimer, the term of this patent is extended or adjusted under 35 U.S.C. 154(b) by 241 days.

(21) Appl. No.: 13/309,554

(22) Filed: Dec. 1, 2011

(65) Prior Publication Data
US 2012/0143742 A1 Jun. 7, 2012

Related U.S. Application Data

(60) Provisional application No. 61/418,861, filed on Dec. 1, 2010.

(51) Int. Cl.
*G06Q 40/00* (2012.01)
(52) U.S. Cl.
USPC .......................................................... 705/37
(58) Field of Classification Search
USPC .................................................... 705/35–37
See application file for complete search history.

(56) References Cited

U.S. PATENT DOCUMENTS

| 2002/0111896 | A1* | 8/2002  | Ben-Levy et al. ............... 705/37 |
| 2004/0177026 | A1  | 9/2004  | Balabon |
| 2005/0015321 | A1  | 1/2005  | Vindekilde |
| 2005/0262003 | A1  | 11/2005 | Brumfield et al. |
| 2009/0048964 | A1* | 2/2009  | Bloom ............................ 705/37 |
| 2009/0132409 | A1  | 5/2009  | Lutnick et al. |
| 2010/0211497 | A1  | 8/2010  | Kessler et al. |

OTHER PUBLICATIONS

Caviedes, Jorge, and Franco Oberti. "A new sharpness metric based on local kurtosis, edge and energy information." Signal Processing: Image Communication 19, No. 2 (2004): 147-161.*
Pestana, Santiago Gonzalez, Edwin Rijpkema, Andrei Radulescu, Kees Goossens, and Om Prakash Gangwal. "Cost-performance trade-offs in networks on chip: A simulation-based approach." In Design, Automation and Test in Europe Conference and Exhibition, 2004. Proceedings, vol. 2, pp. 764-769. IEEE, 2004.*
Casella, Alessandra, and Jonathan S. Feinstein. "Public goods in trade: on the formation of markets and jurisdictions." International Economic Review (2002): 437-462.*
International Search Report and Written Opinion, mailed May 1, 2012, for PCT International Application No. PCT/US2011/062971, filed Dec. 1, 2011.

* cited by examiner

*Primary Examiner* — Hani M Kazimi
*Assistant Examiner* — Chuks Onyezia
(74) *Attorney, Agent, or Firm* — Chadbourne & Parke LLP

(57) ABSTRACT

A processor-implemented method for transforming transaction data and market feed data into trade metrics. The method includes executing a transaction for a financial instrument on a trading network using a server having a processor and interfacing with a database, receiving market data, regarding the financial instrument from a public exchange data source, determining a mark price for the financial instrument, calculating a trade metric for the executed transaction using an executed price for the transaction and the mark price, and storing the trade metric in the database. Trade metric data for a client may then be aggregated and used to categorize the client into one of a plurality of trading pools and to limit access to certain trading pools based on the categorization of the client.

11 Claims, 9 Drawing Sheets

FIG. 2  Example: Client Liquidity Assessment Component

FIG. 3    Example: Liquidity Aggregation Classifier Component

FIG. 4    Example: Liquidity Aggregation Classifier Component

FIG. 5  Example: Notational/Alpha Incentive Component

FIG. 6  Example: Alpha Score Component

FIG. 7    Example: Client Type Gate Component

Example: Client Grouping Component

ALTERNATIVE TRADING SCORECARD APPARATUSES, METHODS, AND SYSTEMS

PRIORITY CLAIM

Applicants hereby claim priority under 35 U.S.C. §119 to U.S. Provisional Patent Application No. 61/418,861, filed Dec. 1, 2010, which is expressly incorporated by reference herein in its entirety.

This application may contain material that is subject to copyright or other intellectual property protection. The respective owners of such intellectual property have no objection to the facsimile reproduction of the disclosure by anyone as it appears in published Patent Office files, but otherwise reserve all rights whatsoever.

FIELD

The present invention is directed generally to apparatuses, methods, and systems of management, execution and assessment of trade orders and executions in alternative trading systems and more particularly, to ALTERNATIVE TRADING SCORECARD APPARATUSES, METHODS, AND SYSTEMS (hereinafter "the Scorecard").

BACKGROUND

Financial exchanges such as the New York Stock Exchange, the American Stock Exchange, the NASDAQ, and others provide traders and brokers with facilities for publicly buying and selling securities and other financial instruments. Raw quotes and trade information from these exchanges may be collected, processed, and distributed to vendors such as Bloomberg, Thomson Reuters, and others. These vendors then provide processed quote and trade information to the general public, including the brokers and traders.

Alternative Trading Systems (ATS) are non-exchange venues that match buyers and sellers, often anonymously. These alternate systems provide access to non-public liquidity sometimes termed dark pools of liquidity. A crossing network is an example of an ATS that matches buy and sell orders electronically. A crossing network may receive raw quotes and trade information in the form of a direct data feed from an exchange. This data is then used to determine a price at which various securities are bought and sold within the crossing network. Crossing networks may allow large orders to be posted, without revealing the price or the identity of the buyer or seller, thus reducing the impact of the trade on the overall market. Dark pool transactions are recorded on the national consolidated tape as over-the-counter (OTC) transactions.

BRIEF DESCRIPTION OF THE DRAWINGS

The accompanying drawings illustrate various non-limiting, exemplary, aspects of the Scorecard.

DETAILED DESCRIPTION

Introduction

Figure 1:
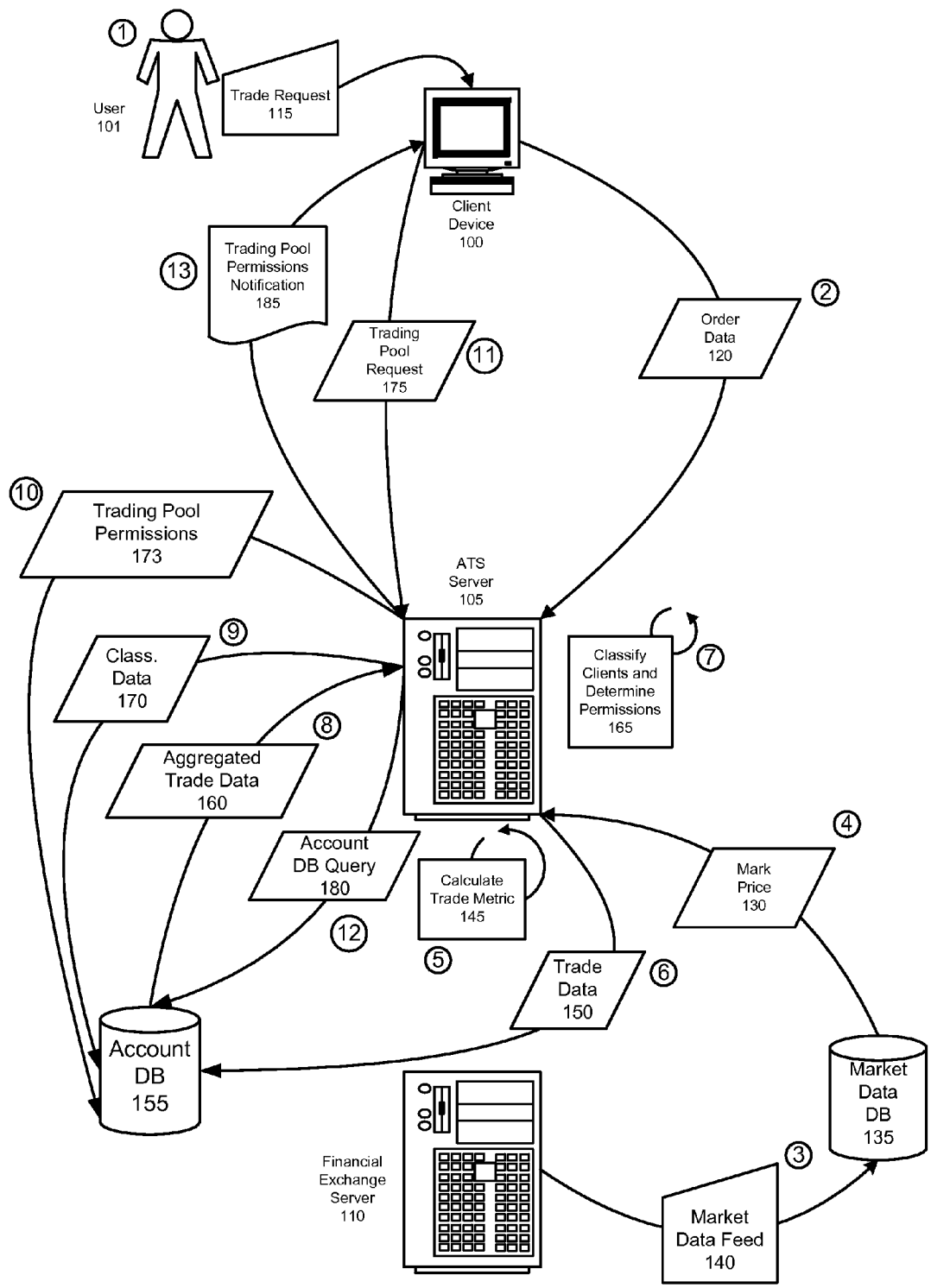
FIG. 1 is a data flow diagram showing an exemplary embodiment of the operation of the Scorecard.

ALTERNATIVE TRADING SCORECARD APPARATUSES, METHODS, AND SYSTEMS ("the Scorecard") will be described below. High-frequency trading is a quantitative, automated trading strategy that uses computers to analyze direct market data feeds from exchanges and quickly exploit market inefficiencies. High-frequency traders may hold investment positions only briefly—often with periods measured in seconds, milliseconds, or even less. High-frequency traders may rapidly trade into and out of their positions thousands of times a day and typically do not retain a net investment position at the end of a trading day.

High-frequency trading may adversely affect the price that a buyer or seller receives on an exchange or crossing network. The Scorecard described in this disclosure allows buyers and sellers (clients) participating in a crossing network or any other alternative trading system, to have greater control over the counterparties with whom they will interact when trading dark pools of liquidity. The Scorecard may analyze a client's trading activity and assign the client to one of a plurality of categories according to that trading activity. The client may then be able to decide which categories of participants they wish to interact with when using the crossing network or other alternative trading system.

The Scorecard provides transparency with regard to parts of the market that might otherwise be unknown; for example, it may shed light on dark pools of liquidity. The Scorecard allows a crossing network or other alternative trading system to compete with public exchanges such as the New York Stock Exchange and the NASDAQ. By giving clients greater control, the Scorecard creates an environment that permits traders with a more long-term horizon to trade without interference from high-frequency traders, if the client so chooses.

Scorecard

In one exemplary embodiment, the Scorecard may assess the quality of trade executions for each client and/or account that uses a crossing network or other alternative trading system by determining a mark price of a security at a predetermined time after each trade is executed—a certain number of seconds, minutes, or ticks, for example—and comparing that price to the price at which the trade was executed. The Scorecard may then classify the clients/accounts that consistently beat the market as traders who may be employing high-frequency trading strategies and then limit and/or restrict their access to the crossing network or other alternative trading system and/or their access to the trade flow of clients/accounts who are not so classified. In one exemplary embodiment, the parameters used in calculating the metric is fully transparent and objective, allowing clients/accounts to readily determine how the metric was calculated and how the category to which they were assigned was reached.

The Scorecard may also provide a client/account with selective control over the types of counterparties with whom the client/account would like to trade. For example, the Scorecard may categorize clients into any suitable number of groups to allow for greater control over the trading process. In one exemplary embodiment, the Scorecard categorizes each client/account into one of three groups: contributory, neutral, and opportunistic. These groups may be defined by one or more metrics calculated by the Scorecard based on trading data from each client/account over a predetermined period, with the contributory clients/accounts being least likely to employ high-frequency trading strategies, based on the metric; the neutral clients/accounts being more likely to employ high-frequency trading strategies, based on the metric; and the opportunistic clients/accounts being the most likely to employ high-frequency trading strategies, based on the metric.

Each client/account within each group may then be able to choose which groups of other clients/accounts they would like to interact with for purposes of trading on the crossing network or other alternative trading system. For example, a contributory client/account may be able to choose to trade only with other contributory clients/accounts for absolute safety; with both neutral and contributory clients/accounts for a balance of safety and liquidity; or with all three groups, including opportunistic clients/accounts, for maximum liquidity and selection, similar to an exchange. In one embodiment, a client/account would only be able to choose to trade with those clients/accounts within the same group or within a group with a higher risk profile, with the contributory group having the lowest risk profile, the neutral group having a higher risk profile, and the opportunistic group having the highest risk profile.

For example, a contributory client/account would be able to choose to trade with any other clients/accounts from any of the three groups, while a neutral client/account would only be able to choose to trade with clients/accounts from the neutral and opportunistic group, and an opportunistic client/account would be limited to trading with other clients/accounts in the opportunistic group. However, because a client/account having a lower risk profile may choose to trade with groups of a higher risk profile, the clients/accounts in the higher risk profiles may have a portion of the clients/accounts within a group having a lower risk profile as available counterparties. Although three groups of have been disclosed above, the Scorecard may categorize clients using a crossing network or other alternative trading system into any number of suitable groups using any suitable trade-quality metric.

Alpha is one example of a suitable trade-quality metric that may be calculated by the Scorecard and used to categorize clients in a crossing network or other alternative trading system, according to one embodiment. Alpha is defined as the profit (or loss, if negative) for each execution in the alternative trading system after a predetermined time. An order placed in the alternative trading system may receive several fills. A large order—for 10,000 shares of IBM, for example—may be split into two or more smaller orders that may get filled separately. A value for alpha may also be calculated for each fill separately. An alpha value may also be calculated across all instruments executed in relation to a client account and/or its counterparty. A counterparty is defined as the party that is on the other side of a trade. In one implementation, an alpha value may be calculated using score data or fill data which may include information relating to an order. For example, fill data may include client/account information (e.g., Client_ID), order size, execution price, execution quantity, bid, ask, time of arrival of order, and the like. Alpha for a particular execution may be calculated by comparing the execution price of the financial instrument with the mark price of that same financial instrument. The mark price is defined as the price of the financial instrument at a predetermined time after the trade was executed. Since there are always two sides in a transaction, the buy side and the sell side, an alpha value may be calculated for the buyer, the seller, or both.

FIG. 1 is a dataflow diagram showing an exemplary embodiment of the operation of the Scorecard. A client device 100 may connect with an ATS server 105 through a network, which may interface with a financial exchange server 110 to receive market data. Client device 100 may be associated with the client's computer network or it may be associated with the computer network of a broker/dealer or other entity who owns or is otherwise authorized to trade on a crossing network or other alternative trading system. Although only one client device 100, one ATS server 105 and one financial exchange server 110 are shown in FIG. 1, any suitable number of servers and clients in any combination and at any number of locations may be used during operation of the Scorecard.

At 105, a user 101 may initiate a trade request 115 to trade a security or other financial instrument using client device 100. For example, client device may send an order requesting to buy 10,000 shares of stock in Motorola. In one exemplary embodiment, trade request 115 is a request to trade a financial instrument on a crossing network to access dark pools of liquidity. Once trade request 115 has been entered into client device 100, client device 100 may transmit order data 120 to ATS server 105. Order data 120 sent to server 105 may include client identification information, the name and/or symbol of the financial instrument being traded, the quantity of the requested trade, whether the trade is a buy or sell order, and any limits on the trade. In one exemplary embodiment, order data 120 may be sent from client device 100 to ATS server 105 in eXtensible Markup Language (XML) format, similar to the example shown below:

```
<?XML version = "1.0" encoding = "UTF-8"?>
<trade_request>
    <timestamp>2012-01-24 17:00:01</timestamp>
    <client_id>
        <client_name>Donald Juan</user_name>
        <client_account_num>987654321</client_account_num>
        <employer_name>Trader Co.</employer_name>
    </client_id>
    <trade_info>
        <symbol>MMI</symbol>
        <company_name>Motorola Mobility Holdings
        Inc.</company_name>
        <trade_side>buy</trade_side>
        <quantity>10000</quantity>
        <order_type>market</order_type>
    </trade_info>
<trade_request>
```

ATS server 105 may be configured to receive order data 120 and execute the requested trade on the crossing network or other alternative trading system. Before execution of the trade, ATS server 105 may determine whether the client is authorized to trade on the crossing network or other alternative trading system based on the client identification information sent as part of order data 120. In one exemplary embodiment, the client will only be allowed to trade on crossing network or other the alternative trading system if the client is a member of the system. Once ATS server 105 has determined that the client has permission to trade on the crossing network or other alternative trading system, server 105 may then locate one or more counterparties for the requested trade and then execute the trade.

After the trade has been executed, ATS server 105 will determine a mark price 130 for the trade. In one embodiment, the mark price may be the publicly published price at a predetermined time after the trade is executed. The predetermined time may be of any suitable length, from microseconds, to hours. In one exemplary embodiment, mark price 130 may be retrieved from a market data database 135, which may receive a market data feed 140 from financial exchange server 110. For example, if a client were to purchase shares of IBM, and the predetermined time was 15 seconds, ATS server 105 would retrieve the prevailing price of IBM shares from the New York Stock Exchange, where shares of IBM are traded publicly. The mark price 130 would be the listed price at the New York Stock Exchange 15 seconds after the trade had been executed. If the client were to sell shares of Apple Inc. (AAPL), the mark price data 130 would be sent to the market data database by the NASDAQ stock exchange, where Apple shares are traded. ATS server 105 may interact with any number of financial exchange servers no to retrieve prices of various securities and other financial instruments.

After receiving the mark price 130 for the executed trade, ATS server may then calculate a trade metric, 145. Examples of this process will be explained in more detail below, as shown for example in FIG. 2 and FIG. 5. Once the trade metric has been calculated, trade data 150 is stored in an account database 155. In one exemplary embodiment, trade data includes the calculated trade metric as well as client identification information, so that the trade metric for a particular trade is associated with the client who made the trade. Examples of the type of data that may be included in trade data 150 is shown in table 1 below:

TABLE 1

| Data Type | Description |
| --- | --- |
| sym | The trading symbol for the instrument executed. |
| side | The side of the execution this row is for. |
| liquidity_indicator | The liquidity indicator column from an alternate trading system. |
| adding_or_removing_liquidity | Parameter for adding or removing liquidity. |
| tick_direction | The last trade's tick direction at the time of the execution. |
| avgprc | The price of the execution. |
| qdone | The execution quantity for this execution. |
| order_size | The total size on the order that this execution was for. |
| client | The client this execution was for. |
| trading_account | The trading account this execution was for. |
| client_account | The client account this execution was for. |
| contra | The client id of the counterparty on the opposite side of the trade. |
| contra_account | The account of the counterparty on the opposite side of the trade. |
| time_in_force | The time in force for the order this execution was for. |
| pinst | The price instruction on the order this execution was for. |
| limit_price | The limit price on the order (zero for a market order) this execution was for. |
| execution_time | The time of the trade that generated this fill. |
| arrival_time | The time or receipt of the order that this execution was for. |
| bid_at_execution | Best (Highest) bid in the public market at the time of this execution. |
| ask_at_execution | Best (Lowest) offer in the public market at the time of this execution. |
| mark_price | Price at a predetermine time after trade execution. |
| vwap | The volume-weighted-average price from the time of execution to the time of marking. |
| shares | The number of shares that traded from the time of execution to the time of marking. |
| ticks | The number of trades after execution used to mark this order. |
| time | The time stamp. |
| liquidity_decile | A number indicating the liquidity decile that this instrument falls into. |
| is_etf | Indicates whether the instrument is an Exchange Traded Fund. |
| cf_execution_id | The execution id for this execution. There may be two such ids for each match—one for each side. |
| abs_px_improvement | The absolute price improvement offered by the client on the order this execution is for. |
| rel_px_improvement | The relative price improvement offered by the client on the order this execution is for. |
| closing_price | The official closing price for this instrument on a given date. |
| error_message | If there were calculation difficulties with the order error flags may be noted in this field. |
| day30_adv | The thirty day average daily volume for this instrument at the time of the job run. |

By storing the trade data 150 for each trade in account database 155, the Scorecard may keep track of information and trade data 150 for all trades that a client has engaged in using the alternative trading system. The Scorecard may also aggregate the stored data for each client, and aggregated trade data 160 for each client may be sent to ATS server 105 on a continual basis or on a periodic basis. By aggregating the data for each client and periodically evaluating the data, the Scorecard may then be able to classify each client and determine the trading permissions to be given to that client, as shown at 165. For example, the Scorecard may classify the client accounts into three groups: contributory, neutral, and opportunistic, as explained in further detail in FIG. 6 and the accompanying description. After a classification for a client has been made, classification data 170 may be stored in account database 155, where it may then may be stored separately or may become part of the aggregated client data 160 for each client, which again may be sent to ATS server 105. In a similar manner, the trading permissions 173 of the client may be stored in account database 155. ATS server may access trading permissions 173 separately in one embodiment. In another embodiment, trading permissions may be included in aggregated trade data 160.

In one exemplary embodiment, after classifying the clients using the alternate trading system, ATS server 105 may automatically determine which groups a given client is allowed to trade with at the time a trade is submitted. For example, when client device 100 submits an order, order data 120 may include an indication of the group that the client account belongs to. When ATS server 105 receives and processes this data, it may restrict the available counterparties for the client accordingly.

In another exemplary embodiment, the alternate trading system may allow each client to control the counterparties with whom they would like to trade by submitting a trading pool request 175. ATS server 105 may be configured to receive the trading pool request 175. If ATS server 105 has up-to-date classification information, server 105 may return trading pool permissions 185 to client device 100. If the information available at the ATS server is not up-to-date, ATS server 105 may send an account database query 180 to account database 155. The results of the query 180 are retrieved from account database 155 back to ATS server 105, for example, in the form of aggregated trade data 160. This aggregated trade data 160 is then used by ATS server 105 to determine the trading permissions available to the requesting client. ATS server 105 then sends notification of these trading pool permissions 185 to client device 100, where user 100 will be able to choose from the available trading groups. The user selection may then be sent from client device 100 to ATS server 105, which then stores this preference information in account database 155.

Figure 2:
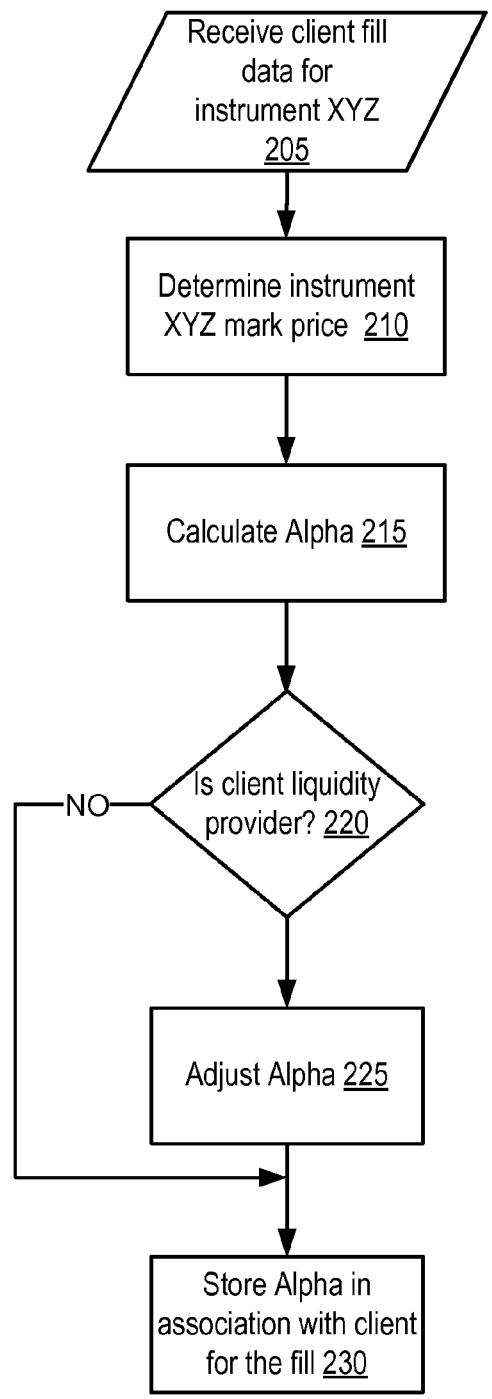
FIG. 2 is a logic flow diagram illustrating calculation of alpha (profit and loss) in one embodiment of the Scorecard.

FIG. 2 is a logic flow diagram illustrating an exemplary calculation of alpha in one embodiment of the Scorecard. For every fill associated with a client and a counterparty, an alpha may be calculated for one or both parties to the transaction. Alpha is defined as the profit (or loss, if negative) for each execution in the alternative trading system. As shown in FIG. 2, at 205, the Scorecard may receive fill data for an instrument XYZ that was executed on behalf of the client (or counterparty). Fill data may include, for example, size of the order filled, execution price, execution quantity, client identification information (e.g., Client_ID), and any other suitable information.

In one embodiment, at 210, the Scorecard may determine the mark price of the instrument XYZ. The mark price is the price of the instrument at a predetermined time after the trade is executed. In one embodiment, the predetermined time may be measured in milliseconds, seconds, minutes, or hours. In another exemplary embodiment, the predetermined time may be measured by ticks, that is, a number of trades executed in the same security after the initial trade was executed. Ticks are recorded and published in real time throughout the trading day. So for example, the predetermined time may be 100 ticks after the trade is executed. In another exemplary embodiment, the predetermined time may be randomly selected by, for example, a random number generator or by other means. For example, the mark price may be the price of the instrument XYZ at a print randomly chosen from between 90 to 110 trades after each fill.

At 215, the Scorecard may calculate alpha or any other suitable metric. In one exemplary implementation, alpha may be calculated as described in the following example: An instrument XYZ is executed at $100.00 for 200 shares when the prevailing public bid is $100.00 and the prevailing public offer is $100.50. One hundred ticks later, the instrument XYZ is printed at $101.00. The seller's alpha may be calculated as follows: sold 200 shares @$100.00, marked to the tooth tick at $101.00, so $$\text{Seller's Alpha} = (\text{Execution Price} - \text{Mark Price}) \times \text{Executed Quantity}$$
$$= (\$100.00 - \$101.00) \times 200$$
$$= -\$200.00 \text{ (a loss)}.$$

In one implementation, a determination may be made at 220 whether the client is a liquidity provider. Such determination may be based on, for example, whether the buyer's or the seller's order arrived first in the crossing network or other alternative trading system. If the buyer's order arrived first, the buyer may be deemed the liquidity provider, while the seller may be deemed the liquidity taker. In a further implementation, the liquidity provider may receive a credit for providing liquidity, or otherwise adjust the alpha value, 225. An exemplary calculation for the buyer's adjusted alpha may be as follows: if the buyer bought 200 shares @ $100.00, marked to the tooth tick at $101.00 with credit for providing liquidity, then $$\text{Buyer's Alpha} = (\text{Mark Price} - \text{Liquidity Credit} - \text{Execution Price}) \times \text{Executed Quantity}$$
$$= ((\$101.00 - \max(\$0, (\$100.50 - \$100.00)/2)) - \$100.00) \times 200 = +\$150.00 \text{ (a gain)}$$

Where max $(x, y)$ returns the greater number of $x$ or $y$.

In one implementation, at 230, the calculated alpha values for the buyer and the seller may be stored in association with client/account identification information. The calculated values for alpha may be expressed in dollars on in any other suitable currency.

Figure 3:
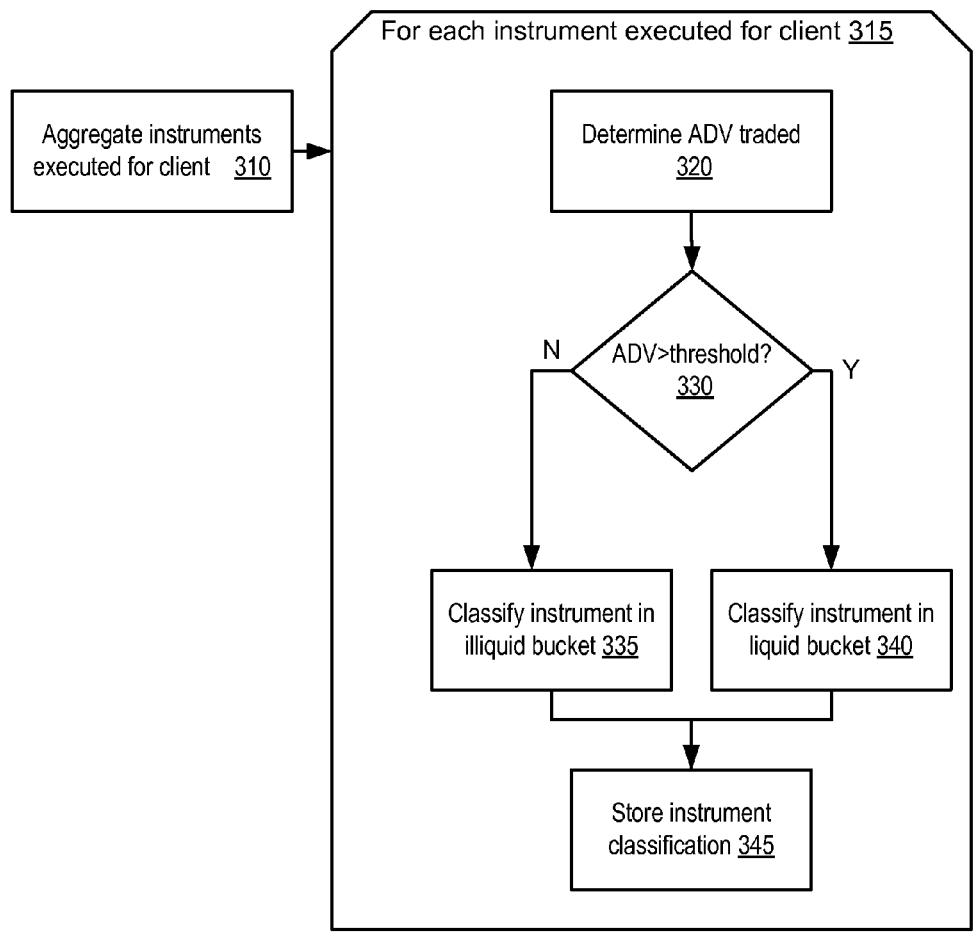
FIG. 3 is a logic flow diagram illustrating classification of a client's executed instruments in one embodiment of the Scorecard.

FIG. 3 is a logic flow diagram illustrating classification of a client's executed instruments in one embodiment of the Scorecard. The classification of the instruments into liquid and illiquid buckets may in one implementation facilitate scoring of clients based on liquidity or illiquidity categories. In one implementation, at 310, the Scorecard may aggregate all instrument execution data relating to a client. At 315, processes may be implemented for each instrument executed for the client. For example, at 320, the Scorecard may determine the average daily volume traded (ADV) for an executed instrument. In one implementation, the determination may be based on market data received from various sources including data feeds. At 330, a determination may be made whether the ADV for an instrument exceeds a predefined threshold value (e.g., $1 million/day). If the ADV for the instrument exceeds the threshold value, the instrument may be classified as a liquid instrument and bucketed into a liquid category at 340. If, on the other hand, the ADV for the instrument is below the threshold, the instrument may be classified as an illiquid instrument and bucketed into an illiquid category at 335. The classification may, in one implementation, be stored in one or more tables and/or databases at 345. Alternatively, the instruments may be classified with more granularity into any number of liquidity categories. For example, the instruments may be classified into liquidity deciles.

Figure 4:
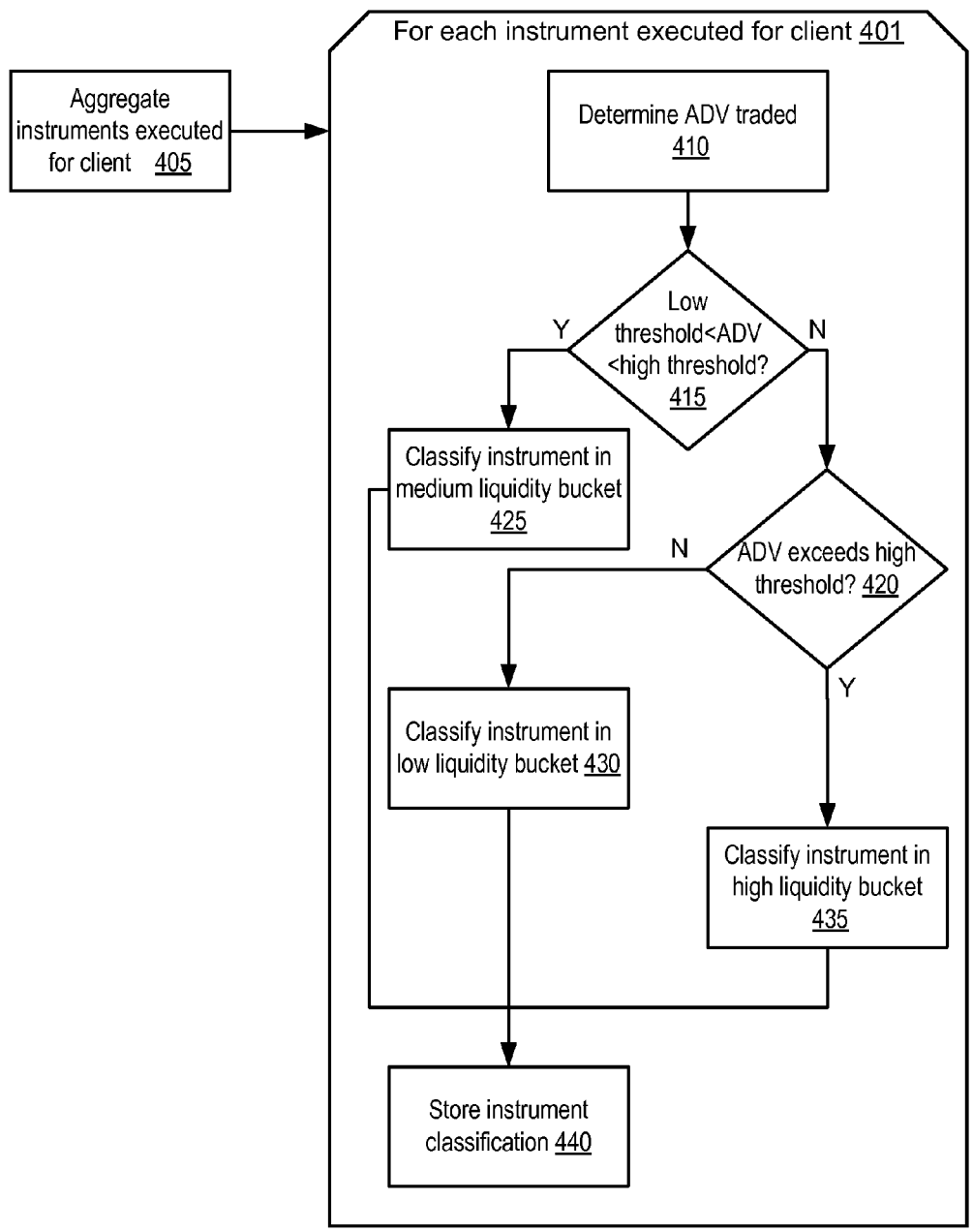
FIG. 4 is a logic flow diagram illustrating classification of a client's executed instruments in another embodiment of the Scorecard.

FIG. 4 is a logic flow diagram illustrating classification of a client's executed instruments in another embodiment of the Scorecard. In one implementation, the classification of the executed instruments relating to a client into categories such as low liquidity, high liquidity, and medium liquidity may further facilitate scoring of clients in accordance with liquidity characteristics of instrument executions. In one implementation, classification may begin with the aggregation of the instruments executed for a client at 405. In a further implementation, data relating to all instrument executions for the client over a period of time (e.g., one month, three months, etc.) may be aggregated. The processes at 401 may be repeated for each instrument executed for the client. In one implementation, the ADV traded for an instrument may be determined at 410. The determined ADV may then be compared to predefined low (e.g., $0.5 million/day) and high thresholds ($1 million/day) at 415. If the determined ADV is within the range defined by the low and high thresholds, the Scorecard may classify the instrument in a medium liquidity bucket at 425. If, on the other hand, the determined ADV exceeds the high threshold upon comparison at 420, the instrument may be classified in a high liquidity bucket at 435. If the comparison at 420 determines that the instrument's ADV does not exceed the high threshold, the Scorecard may classify the instrument in a low liquidity bucket at 430. In a further implementation, upon classifying instruments into low, medium, or high liquidity buckets, the Scorecard may store the instrument classification, 440 in one or more databases and/or tables.

Figure 5:
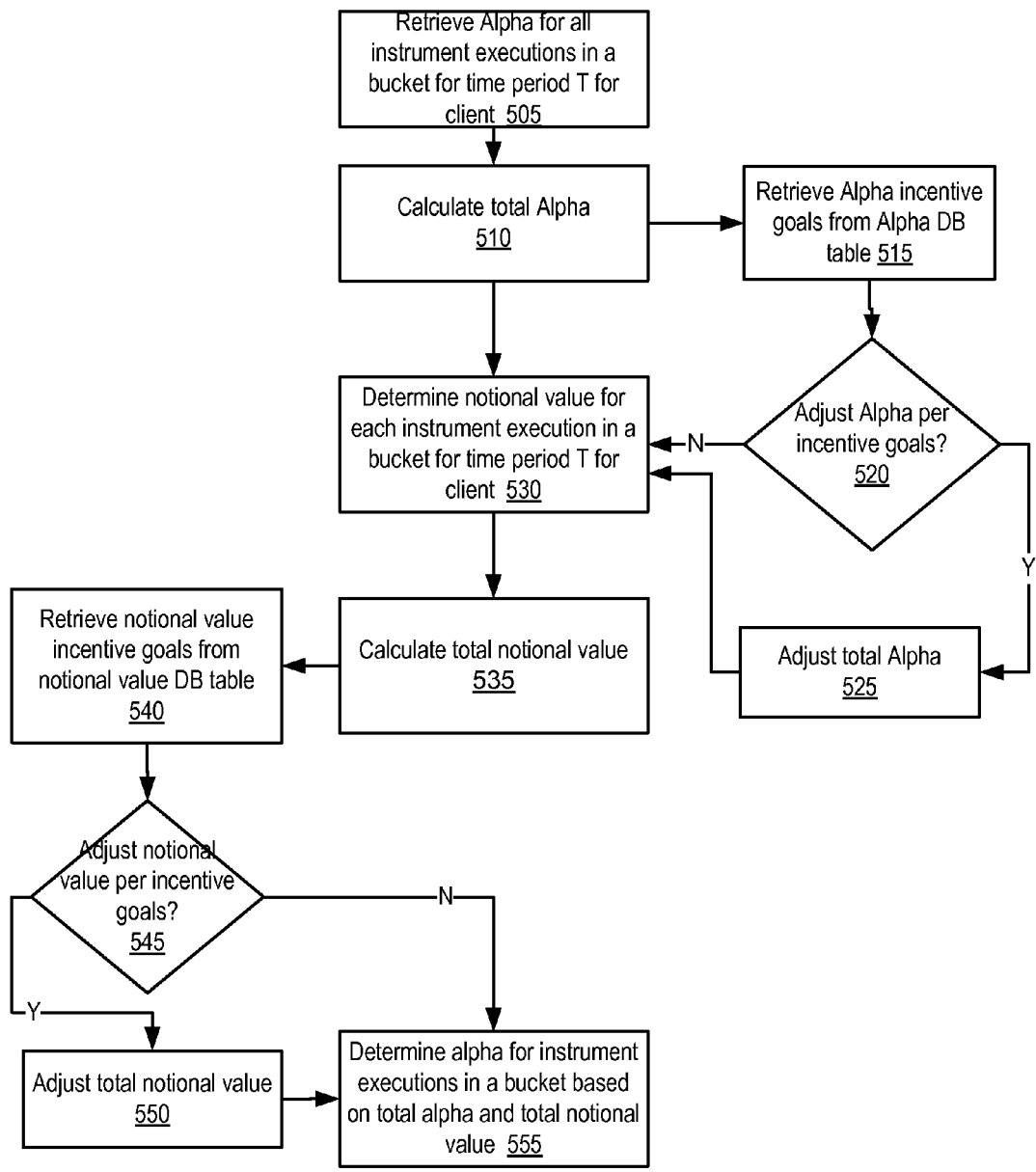
FIG. 5 is a logic flow diagram illustrating calculation of the metric alpha in one embodiment of the Scorecard.

FIG. 5 is a logic flow diagram illustrating an exemplary calculation of the metric alpha in one embodiment of the Scorecard. In one embodiment, an alpha, in addition to being client-specific, may also be instrument-bucket or category specific. For example, alpha values may be calculated for liquid, illiquid, low liquidity, medium liquidity, high liquidity or all inclusive buckets. In one implementation, the determination of alpha may be a periodic endeavor. For example, alpha for a client's one or more buckets of instruments may be calculated every month, every three months, every six months, or at any other suitable interval. The calculation of alpha for the instruments in a particular bucket of a client may begin at 505 with the retrieving (e.g., by using an SQL select statement) of alpha values associated with the instruments in the bucket. The alpha values may be stored in one or more tables and/or databases in association with, for example, client identification information and a bucket identification information. At 510, the retrieved alpha values may be summed together to calculate a total alpha value. In a further implementation, the client may receive a credit or a discount for achieving certain incentive goals. At 515, alpha incentive goals are retrieved from an alpha database table. At 520, a determination is made as to whether the alpha value should be adjusted based on the retrieved incentive goals. At 525, the total value for Alpha, which was previously calculated, is adjusted if the alpha incentive goals are met.

At 530, the Scorecard may determine a notional value for each instrument in the bucket. In one implementation, the notional value may be calculated as a product of the fill size and the execution price. The Scorecard may then calculate at 535, a total notional value of the bucket by summation of notional values for all instruments in the bucket. In a further implementation, the client may receive a credit or a discount for achieving certain notional value incentive goals. At 540, notional value incentive goals are retrieved from an alpha database table. At 545, a determination is made as to whether the notional value should be adjusted based on the retrieved incentive goals. At 550, the total notional value, which was previously calculated, is adjusted if the notional value incentive goals are met. Using the calculated total alpha value and the total notional value, an alpha for the client's bucket may be calculated at 555. In one implementation, alpha for the bucket may be calculated by dividing the total alpha value by the total notional value. In a further implementation, the dimensionless alpha may be converted to basis points. The calculated alpha may then be utilized for scoring clients into one or more categories that determine their ability to interact with other members of the alternative trading system.

In one exemplary implementation, clients with an alpha that is less than 1 basis point above the notional value may be classified as contributory traders; those clients with alpha that is between one and three basis points above the notional value may be classified as neutral traders, and those clients with alpha that greater than three basis points may be classified as opportunistic traders. These limits are only examples and may be changed to suit the needs of the alternative trading system. After calculating an alpha value for a given client, the Scorecard may then limit the counterparties with which the client can trade based on this classification.

Figure 6:
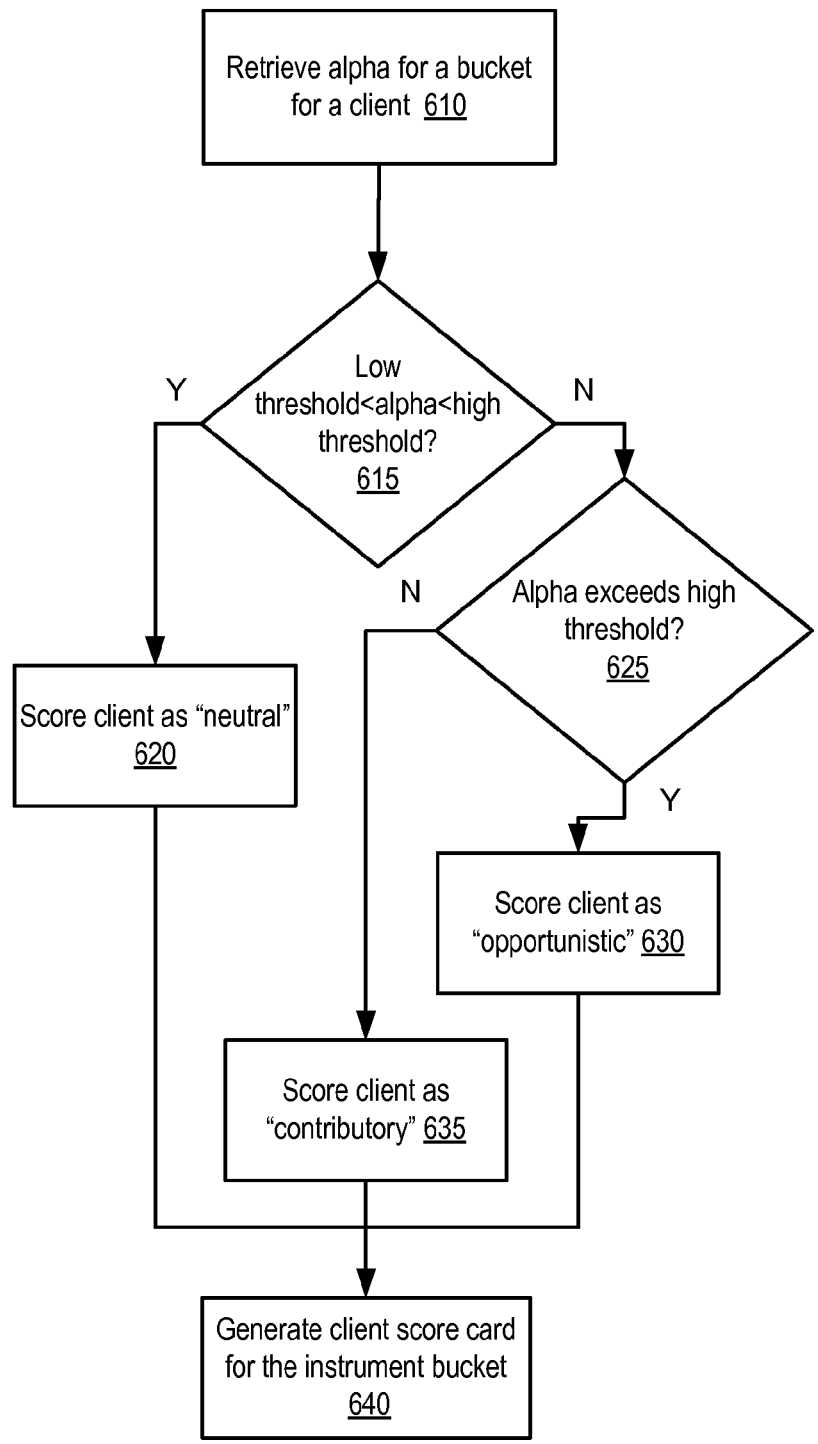
FIG. 6 is a logic flow diagram illustrating scoring of clients based on the metric alpha in one embodiment of the Scorecard.

FIG. 6 is a logic flow diagram illustrating the scoring of clients based on the metric alpha in one embodiment of the Scorecard. As shown, the Scorecard may retrieve from one or more tables and/or databases alpha for an instrument bucket relating to a client at 610. The Scorecard may then compare the retrieved alpha to low and high thresholds at 615 to determine if the client should be scored as contributory, neutral or opportunistic. In one implementation, the type of scoring may determine the type of interactions (e.g., low risk, toxic, low liquidity, etc.) that a client is able to access within the alternative trading system.

In one implementation, the thresholds specified in comparisons here and elsewhere may be bucket specific. In such a case, scoring of clients using a liquid bucket may vary from scoring using a low liquidity bucket. If the alpha is within the range defined by the thresholds at 615, the Scorecard may score the client as neutral at 620. If the alpha is not within the range, and exceeds the high threshold upon comparison at 625, the Scorecard may score the client as opportunistic at 630. If on the other hand, the alpha is not within the range and does not exceed the high threshold, the alpha is less than the low threshold. In such a case, the Scorecard may score the client as contributory at 635. At 640 the Scorecard may generate a bucket-specific score card for the client. In one implementation, the generated score card may be stored in one or more tables and/or databases in association with the client and/or the bucket.

Figure 7:
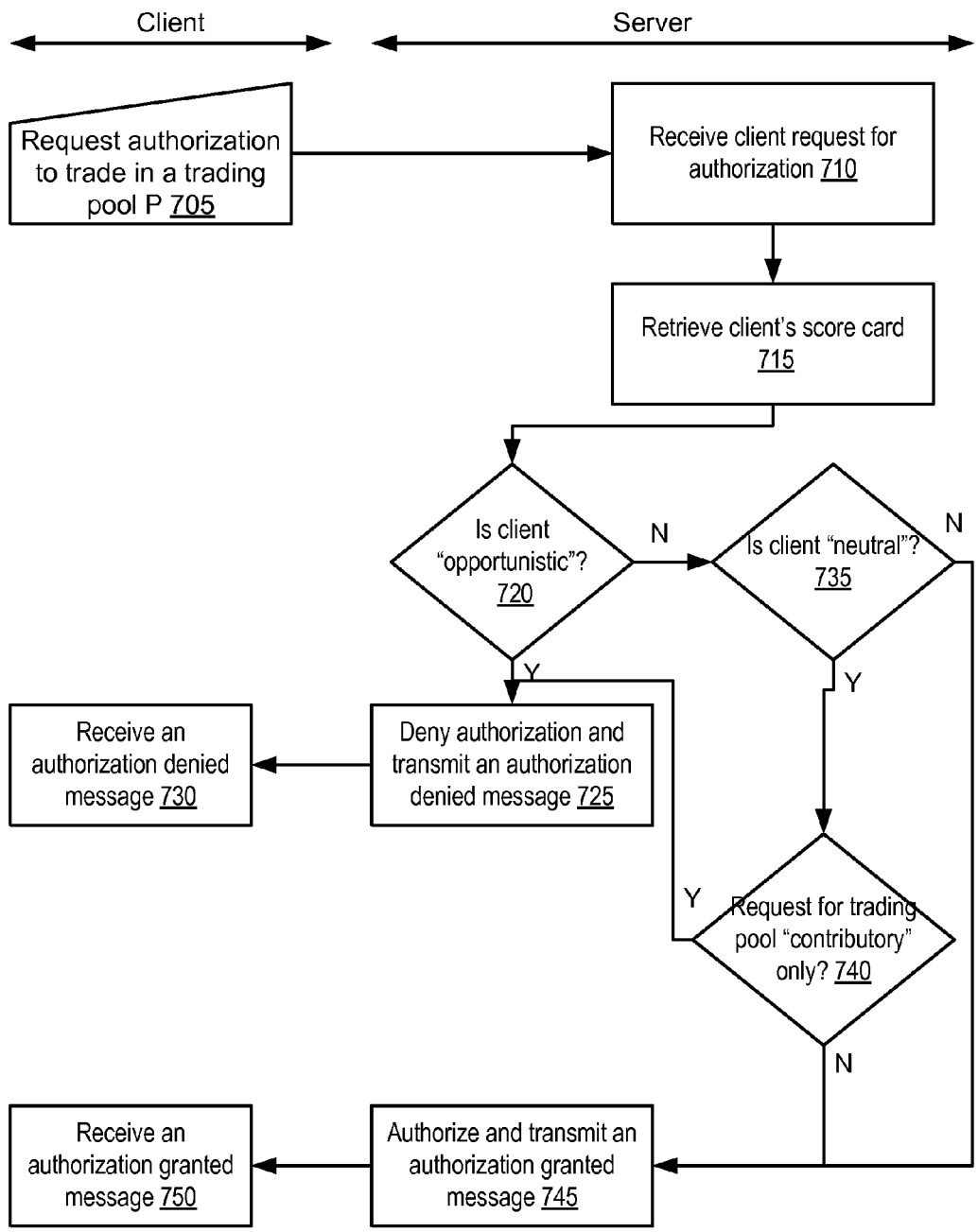
FIG. 7 is a logic flow diagram illustrating client server interactions for trading pool selection in one embodiment of the Scorecard.

FIG. 7 is a logic flow diagram illustrating client server interactions for trading pool selection in one embodiment of the Scorecard. At 705, a client may request an authorization to trade in a trading pool having desired characteristics (e.g., liquidity). The request may be received by the Scorecard on the server side at 710. The Scorecard may, in response to the request, retrieve the requesting client's aggregated trade data from one or more tables and/or databases at 715. At 720, the Scorecard may determine, based on aggregated trade data for the client, whether the client should be categorized as an opportunistic trader.

In one implementation, the Scorecard may access one or more trading pool selection rules to determine whether clients should be allowed access to certain trading pools. At 720, if the client is categorized as an opportunistic trader, the client may be restricted to trading in only the opportunistic pool which may operate in a manner similar to public exchanges and may carry increased risks. At 725, the client's request may be denied and a request denied message may be received by the client at 730.

If, on the other hand, the Scorecard determines that the client is neither opportunistic nor neutral at 735, then the client is categorized as contributory. Using one or more trading rules, the Scorecard may then authorize and transmit an authorization message to the client at 745, which may be received at 750. In another case, the client may be deemed neutral at 735. At 740, using a trading rule that a neutral client may not trade in a contributory only pool, the Scorecard may at 725 deny the client's request. However, at 740, using a trading rule that a neutral client may trade in a neutral pool including both neutral and contributory clients and, at its option, opportunistic pools, the Scorecard may authorize the client's request to access a trading pool that is not contributory.

Figure 8:
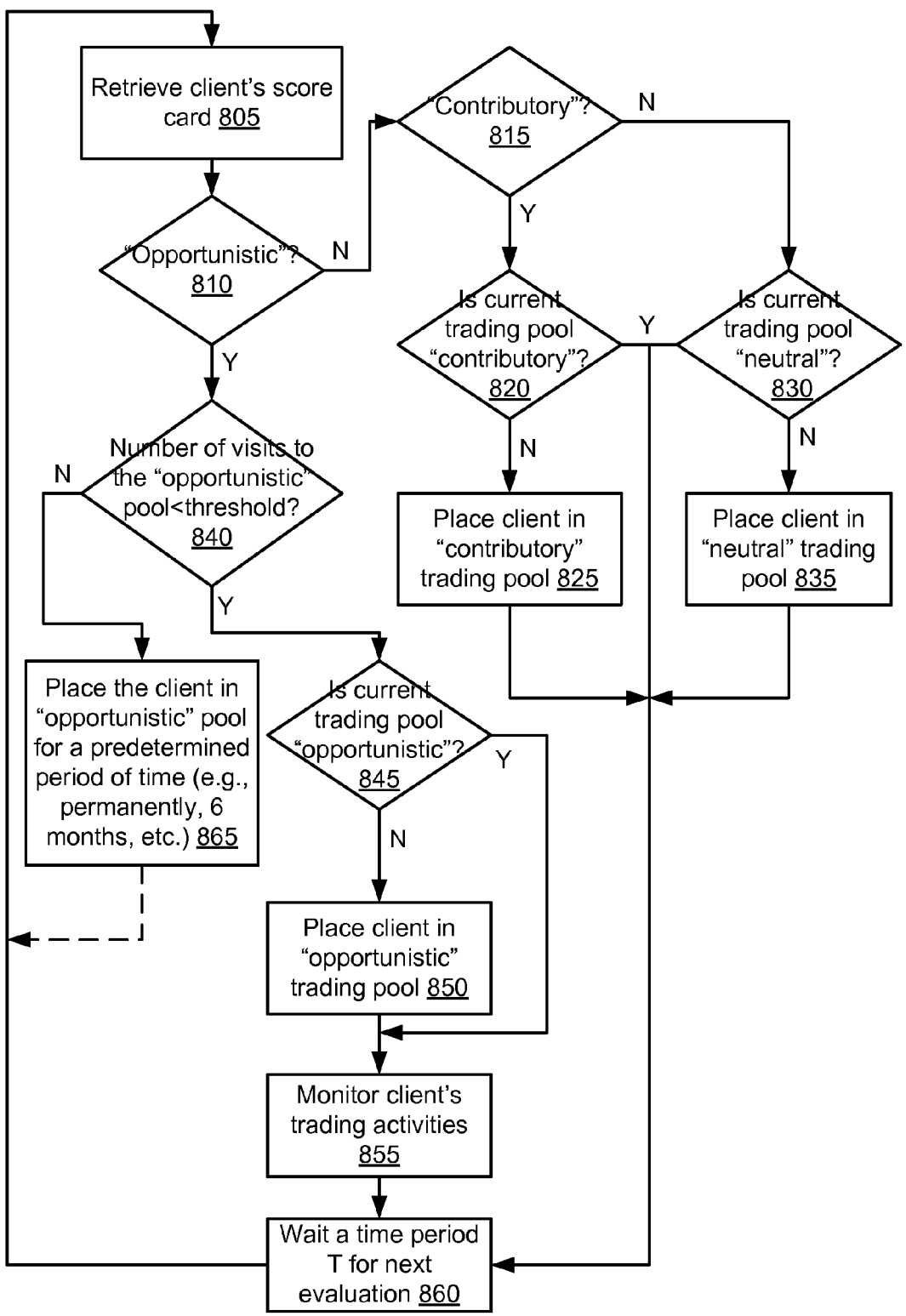
FIG. 8 is a logic flow diagram illustrating regulation of clients in trading pools in one embodiment of the Scorecard.

FIG. 8 is a logic flow diagram illustrating regulation of clients in trading pools in one embodiment of the Scorecard. At 805, the Scorecard may retrieve a client's aggregated trade data and determine whether the client is opportunistic at 810. If the client's behavior has been opportunistic and if the client has been placed in the opportunistic pool more than a threshold number of times as determined at 840, the Scorecard may recommend that client to be restricted to interactions only in the opportunistic pool for a predetermined period of time (e.g, permanently, six months, or any other suitable time period) at 865.

If the opportunistic trader has been assigned to the opportunistic pool less than the threshold as determined at 840, and the opportunistic client is currently in a different pool, as determined at 845, the Scorecard may remove the client from the current pool and placed the client in the opportunistic pool at 850. In a further implementation, the client's activities may be monitored at 855. The client may then be obliged to remain in the opportunistic pool and wait for the next evaluation period at 860. If the opportunistic client is already in the opportunistic pool, no further action may be necessary. Similarly, if the client is determined to be contributory at 815 and is not currently in the contributory pool, as determined at 820, the Scorecard may move the client to the contributory pool, 825. In the same way, if the client is neutral and the current trading pool is not neutral, as determined at 830, the client may be relocated to the neutral trading pool, 835 and restricted to the interactions, restrictions and advantages offered by the neutral trading pool.

Scorecard Controller

Figure 9:
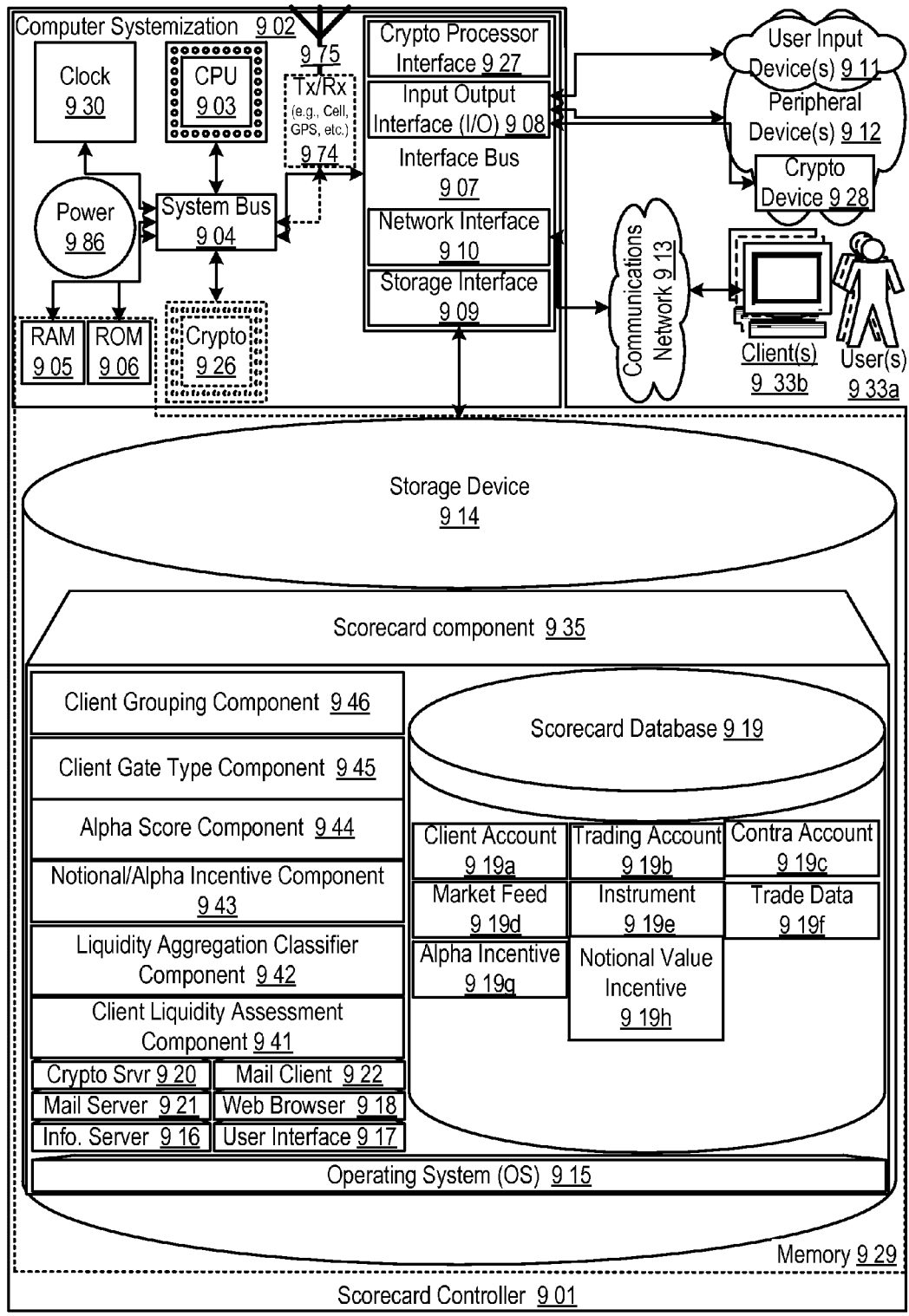
FIG. 9 is a block diagram illustrating embodiments of the Scorecard controller.

FIG. 9 shows a block diagram illustrating embodiments of a Scorecard controller. In this embodiment, the Scorecard controller 901 may serve to aggregate, process, store, search, serve, identify, instruct, generate, match, and/or facilitate interactions with a computer through technologies, and/or other related data.

Typically, users, which may be people and/or other systems, may engage information technology systems (e.g., computers) to facilitate information processing. In turn, computers employ processors to process information; such processors 903 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 929 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by the CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the Scorecard controller 901 may be connected to and/or communicate with entities such as, but not limited to: one or more users from user input devices 911; peripheral devices 912; an optional cryptographic processor device 928; and/or a communications network 913.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The Scorecard controller 901 may be based on computer systems that may comprise, but are not limited to, components such as: a computer systemization 902 connected to memory 929.

Computer Systemization

A computer systemization 902 may comprise a clock 930, central processing unit ("CPU(s)" and/or "processor(s)" (these terms are used interchangeable throughout the disclosure unless noted to the contrary)) 903, a memory 929 (e.g., a read only memory (ROM) 906, a random access memory (RAM) 905, etc.), and/or an interface bus 907, and most frequently, although not necessarily, are all interconnected and/or communicating through a system bus 904 on one or more (mother)board(s) having conductive and/or otherwise transportive circuit pathways through which instructions (e.g., binary encoded signals) may travel to effectuate communications, operations, storage, etc. The computer systemization may be connected to a power source 986; e.g., optionally the power source may be internal. Optionally, a cryptographic processor 926 and/or transceivers (e.g., ICs) 974 may be connected to the system bus. In another embodiment, the cryptographic processor and/or transceivers may be connected as either internal and/or external peripheral devices 912 via the interface bus I/O. In turn, the transceivers may be connected to antenna(s) 975, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing Scorecard controller to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 929 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the Scorecard controller and beyond through various interfaces. Should processing requirements dictate a greater amount of speed and/or capacity, distributed processors (e.g., Distributed Scorecard), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the Scorecard may be achieved by implementing a microcontroller such as CAST's R8051XC2 microcontroller; Intel's MCS 51 (i.e., 8051 microcontroller); and/or the like. Also, to implement certain features of the Scorecard, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the Scorecard component collection (distributed or otherwise) and/or features may be implemented via the microprocessor and/or via embedded components; e.g., via ASIC, coprocessor, DSP, FPGA, and/or the like. Alternately, some implementations of the Scorecard may be implemented with embedded components that are configured and used to achieve a variety of features or signal processing.

Depending on the particular implementation, the embedded components may include software solutions, hardware solutions, and/or some combination of both hardware/software solutions. For example, Scorecard features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the Scorecard features. A hierarchy of programmable interconnects allow logic blocks to be interconnected as needed by the Scorecard system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the Scorecard may be developed on regular FPGAs and then migrated into a fixed version that more resembles ASIC implementations. Alternate or coordinating implementations may migrate Scorecard controller features to a final ASIC instead of or in addition to FPGAs. Depending on the implementation all of the aforementioned embedded components and microprocessors may be considered the "CPU" and/or "processor" for the Scorecard.

Power Source

The power source 986 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 986 is connected to at least one of the interconnected subsequent components of the Scorecard thereby providing an electric current to all subsequent components. In one example, the power source 986 is connected to the system bus component 904. In an alternative embodiment, an outside power source 986 is provided through a connection across the I/O 908 interface. For example, a USB and/or IEEE 1394 connection carries both data and power across the connection and is therefore a suitable source of power.

Interface Adapters

Interface bus(ses) 907 may accept, connect, and/or communicate to a number of interface adapters, conventionally although not necessarily in the form of adapter cards, such as but not limited to: input output interfaces (I/O) 908, storage interfaces 909, network interfaces 910, and/or the like. Optionally, cryptographic processor interfaces 927 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 909 may accept, communicate, and/or connect to a number of storage devices such as, but not limited to: storage devices 914, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 910 may accept, communicate, and/or connect to a communications network 913. Through a communications network 913, the Scorecard controller is accessible through remote clients 933b (e.g., computers with web browsers) by users 933a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed Scorecard), architectures may similarly be employed to pool, load balance, and/or otherwise increase the communicative bandwidth required by the Scorecard controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 910 may be used to engage with various communications network types 913. For example, multiple network interfaces may be employed to allow for the communication over broadcast, multicast, and/or unicast networks.

Input Output interfaces (I/O) 908 may accept, communicate, and/or connect to user input devices 911, peripheral devices 912, cryptographic processor devices 928, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 911 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 912 may be connected and/or communicate to I/O and/or other facilities of the like such as network interfaces, storage interfaces, directly to the interface bus, system bus, the CPU, and/or the like. Peripheral devices may be external, internal and/or part of the Scorecard controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the Scorecard controller may be embodied as an embedded, dedicated, and/or monitor-less (i.e., headless) device, wherein access would be provided over a network interface connection.

Cryptographic units such as, but not limited to, microcontrollers, processors 926, interfaces 927, and/or devices 928 may be attached, and/or communicate with the Scorecard controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33MHz 6868; and/or the like.

Memory

Generally, any mechanization and/or embodiment allowing a processor to affect the storage and/or retrieval of information is regarded as memory 929. However, memory is a fungible technology and resource, thus, any number of memory embodiments may be employed in lieu of or in concert with one another. It is to be understood that the Scorecard controller and/or a computer systemization may employ various forms of memory 929. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 929 will include ROM 906, RAM 905, and a storage device 914. A storage device 914 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 929 may contain a collection of program and/or database components and/or data such as, but not limited to: operating system component(s) 915 (operating system); information server component(s) 916 (information server); user interface component(s) 917 (user interface); Web browser component(s) 918 (Web browser); database(s) 919; mail server component(s) 921; mail client component(s) 922; cryptographic server component(s) 920 (cryptographic server); the Scorecard component(s) 935; the client liquidity assessment component(s) 941; the liquidity aggregation classifier component(s) 942; the notional/alpha incentive component(s) 943; the alpha score component(s) 944; the client gate type component(s) 945; the client grouping component(s) 946; and/or the like (i.e., collectively a component collection). These components may be stored and accessed from the storage devices and/or from storage devices accessible through an interface bus. Although non-conventional program components such as those in the component collection, typically, are stored in a local storage device 914, they may also be loaded and/or stored in memory such as: peripheral devices, RAM, remote storage facilities through a communications network, ROM, various forms of memory, and/or the like.

Operating System

The operating system component 915 is an executable program component facilitating the operation of the Scorecard controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Nan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the Scorecard controller to communicate with other entities through a communications network 913. Various communication protocols may be used by the Scorecard controller as a subcarrier transport mechanism for interaction, such as, but not limited to: multicast, TCP/IP, UDP, unicast, and/or the like.

Information Server

An information server component 916 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the Scorecard controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the Scorecard database 919, operating systems, other program components, user interfaces, Web browsers, and/or the like.

Access to the Scorecard database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the Scorecard. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the Scorecard as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 917 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 918 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the Scorecard enabled nodes. The combined application may be nugatory on systems employing standard Web browsers.

Mail Server

A mail server component 921 is a stored program component that is executed by a CPU 903. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the Scorecard.

Access to the Scorecard mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 922 is a stored program component that is executed by a CPU 903. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 920 is a stored program component that is executed by a CPU 903, cryptographic processor 926, cryptographic processor interface 927, cryptographic processor device 928, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the Scorecard may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the Scorecard component to engage in secure transactions if so desired. The cryptographic component facilitates the secure accessing of resources on the Scorecard and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The Scorecard Database

The Scorecard database component 919 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the Scorecard database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the Scorecard database is implemented as a data-structure, the use of the Scorecard database 919 may be integrated into another component such as the Scorecard component 935. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 919 includes several tables 919a-h. A Client Account table 919a includes fields such as, but not limited to: a Client_ID, name, address, credit, user name, password and/or the like. The Client Account table may support and/or track multiple entity accounts on the Scorecard. A Trading Account table 919b includes fields such as, but not limited to: account_ID, account name, transaction ID, execution price, arrival time, and/or the like. A Contra Account table 919c includes fields such as, but not limited to: Contra_ID, name, address, credit and/or the like A market data feed table 919d includes fields such as, but not limited to: market_data_feed_ID, asset_ID, asset_symbol, asset_name, spot_price, bid_price, ask_price, and/or the like; in one embodiment, the market data table is populated through a market data feed (e.g., Bloomberg's PhatPipe, Dun & Bradstreet, Reuter's Tib, Triarch, etc.), for example, through Microsoft's Active Template Library and Dealing Object Technology's real-time toolkit Rtt.Multi. An Instrument table 919e includes fields such as, but not limited to: instrument_ID, instrument name, liquidity type, and/or the like. A trade data table 919f includes fields such as, but not limited to: trade_data_id, sym, side, liquidity_indicator, adding_or_removing_liquidity, tick_direction, avgprc, qdone, order_size, client, trading_account, client_account, contra, contra_account, time_in_force, pinst, limit_price, execution_time, arrival_time, bid_at_execution, ask_at_execution, mark_price, vwap, shares, ticks, time, liquidity_decile, is_etf, cf_execution_id, abs_px_improvement, rel_px_improvement, closing_price, error_message, day30_adv, and/or the like. An alpha incentive table 919g includes fields such as, but not limited to: alpha_incentive_ID, alpha_value, alpha_incentive_goal, alpha_preference, alpha_value_discount, and/or the like. A notional value data table includes fields such as, but not limited to: notional_incentive_ID, notional_value, notional_incentive_goal, notional_preference, notional_value_discount, and/or the like.

In one embodiment, the Scorecard database may interact with other database systems. For example, employing a distributed database system, queries and data access by search Scorecard component may treat the combination of the Scorecard database, an integrated data security layer database as a single database entity.

In one embodiment, user programs may contain various user interface primitives, which may serve to update the Scorecard. Also, various accounts may require custom database tables depending upon the environments and the types of clients the Scorecard may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 919a-h. The Scorecard may be configured to keep track of various settings, inputs, and parameters via database controllers.

The Scorecard database may communicate to and/or with other components in a component collection, including itself, and/or facilities of the like. Most frequently, the Scorecard database communicates with the Scorecard component, other program components, and/or the like. The database may contain, retain, and provide information regarding other nodes and data.

The Scorecards

The Scorecard component 935 is a stored program component that is executed by a CPU. In one embodiment, the Scorecard component incorporates any and/or all combinations of the aspects of the Scorecard that was discussed in the previous figures. As such, the Scorecard affects accessing, obtaining and the provision of information, services, transactions, and/or the like across various communications networks.

The Scorecard transforms instrument execution and market data inputs via the Scorecard components, trade execution components, metric calculation components, financial exchange components, alternative trading system components and categorization components into trade data, aggregate client data, and permission outputs.

The Scorecard component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the Scorecard server employs a cryptographic server to encrypt and decrypt communications. The Scorecard component may communicate to and/or with other components in a component collection, including itself, and/or facilities of the like. Most frequently, the Scorecard component communicates with the Scorecard database, operating systems, other program components, and/or the like. The Scorecard may contain, communicate, generate, obtain, and/or provide program component, system, user, and/or data communications, requests, and/or responses.

Distributed Scorecards

The structure and/or operation of any of the Scorecard node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the Scorecard controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c -post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the Scorecard controller may be executing a PHP script implementing a Secure Sockets Layer ("SSL") socket server via the information sherver, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
message
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm tured data. In another embodiment, inter-application data processing protocols themselves may have integrated and/or readily available parsers (e.g., JSON, SOAP, and/or like parsers) that may be employed to parse (e.g., communications) all of which are hereby expressly incorporated by reference.

In order to address various issues and advance the art, the entirety of this application for ALTERNATIVE TRADING SCORECARD APPARATUSES, METHODS, AND SYSTEMS (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternative embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a Scorecard individual and/or enterprise user, database configuration and/or relational model, data type, data transmission and/or network framework, syntax structure, and/or the like, various embodiments of the Scorecard, may be implemented that enable a great deal of flexibility and customization. For example, aspects of the Scorecard may be adapted for scoring executions in alternate trading systems. While various embodiments and discussions of the Scorecard have included reference to securities and other financial instruments it is to be understood that the embodiments described herein may be readily configured and/or customized for a wide variety of other applications and/or implementations.

The invention claimed is:

1. A processor-implemented method for transforming transaction data and market feed data into trade metrics, the method comprising:
   executing a transaction for a financial instrument on a trading network using a server having a processor and interfacing with a database;
   receiving market data, at the server, regarding the financial instrument from a public exchange data source;
   determining, using the processor, a mark price for the financial instrument;
   calculating, using the processor, a trade metric for the executed transaction using an executed price for the transaction and the mark price;
   storing the trade metric in the database;
   associating the trade metric for the executed transaction with a client account stored in the database; and
   repeating the method for a plurality of transactions and aggregating the resulting trade metrics for each client account.

2. The method of claim 1, further comprising categorizing each client account into one of a plurality of trading categories based on the aggregated trade metric.

3. The method of claim 2, further comprising dividing the trading network into trading pools and limiting access to the trading pools for each client account based on the categorization of each client account.

4. A processor-implemented method for transforming transaction data and market feed data into trade metrics, the method comprising:
   executing a transaction for a financial instrument on a trading network using a server having a processor and interfacing with a database;
   receiving market data, at the server, regarding the financial instrument from a public exchange data source;
   determining, using the processor, a mark price for the financial instrument;
   calculating, using the processor, a trade metric for the executed transaction using an executed price for the transaction and the mark price; and
   storing the trade metric in the database;
   wherein the trade metric calculated using the executed price and the mark price is the profit or loss to a client for each executed transaction.

5. A processor-implemented method for transforming transaction data and market feed data into trade metrics, the method comprising:
   executing a transaction for a financial instrument on a trading network using a server having a processor and interfacing with a database;
   receiving market data, at the server, regarding the financial instrument from a public exchange data source;
   determining, using the processor, a mark price for the financial instrument;
   calculating, using the processor, a trade metric for the executed transaction using an executed price for the transaction and the mark price;
   storing the trade metric in the database; and
   adjusting the trade metric when a client requesting the transaction execution is determined to be a liquidity provider.

6. A trading network comprising:
   a server interfacing with a database and configured to receive a market data feed from a public exchange;

a trade execution component interfacing with the server and configured to receive a trade order for a financial instrument from a client device and to fill the trade order;

a financial exchange component interfacing with the server and configured to receive market data from a public exchange, determine a mark price for the filled trade, and relay the market data and the mark price to the server; and a metric calculation component interfacing with the server and configured to calculate a trade metric for each filled trade based on an executed trade price and the mark price;

wherein the metric calculation component is further configured to associate the trade metric for the executed transaction with a client account stored in the database; and wherein the metric calculation component is further configured to calculate the trade metric for a plurality of transactions and to aggregate the resulting trade metrics for the client account into an aggregated trade metric.

7. The trading network of claim 6, further comprising a categorization component, interfacing with the server and configured to categorize each client account into one of a plurality of trading categories based on the aggregated trade metric.

8. The trading network of claim 7, wherein the categorization component is further configured to divide the trading network into trading pools and to limit access to the trading pools for each client account based on the categorization of each client account.

9. The trading network of claim 7, wherein the financial exchange component is further configured to receive an average daily volume value for the financial instrument and wherein the categorization component is configured to receive the average daily volume and determine whether the financial instrument meets a threshold for liquidity.

10. The trading network of claim 9, wherein the categorization component is further configured to categorize client accounts with respect to the trade metric and the liquidity threshold.

11. A trading network comprising:
a server interfacing with a database and configured to receive a market data feed from a public exchange;

a trade execution component interfacing with the server and configured to receive a trade order for a financial instrument from a client device and to fill the trade order;

a financial exchange component interfacing with the server and configured to receive market data from a public exchange, determine a mark price for the filled trade, and relay the market data and the mark price to the server; and a metric calculation component interfacing with the server and configured to calculate a trade metric for each filled trade based on an executed trade price and the mark price;

wherein the metric calculation component is configured to adjust the trade metric when a client requesting the transaction execution is determined to be a liquidity provider.

* * * * *